United States Patent [19]

Tezuka et al.

[11] 4,179,206
[45] * Dec. 18, 1979

[54] SINGLE LENS REFLEX CAMERA WITH ELECTROMECHANICALLY INITIATED DIAPHRAGM AND SHUTTER CONTROL

[75] Inventors: Nobuo Tezuka, Tokyo; Masanori Uchidoi, Kawasaki; Yukio Iura, Yokosuka; Satoshi Watanabe, Inagi; Masayoshi Yamamichi, Kawasaki; Hiroshi Aizawa, Machida, all of Japan

[73] Assignee: Canon Kabushiki Kaisha, Tokyo, Japan

[*] Notice: The portion of the term of this patent subsequent to Dec. 6, 1994, has been disclaimed.

[21] Appl. No.: 790,935

[22] Filed: Apr. 26, 1977

Related U.S. Application Data

[63] Continuation of Ser. No. 593,301, Jul. 7, 1975, Pat. No. 4,062,028.

[30] Foreign Application Priority Data

Jul. 9, 1974 [JP] Japan .................................. 49-78494
Jul. 9, 1974 [JP] Japan .................................. 49-78495
Jul. 17, 1974 [JP] Japan .................................. 49-83061
Jul. 17, 1974 [JP] Japan .................................. 49-83062

[51] Int. Cl.² .............................................. G03B 19/12
[52] U.S. Cl. ................................... 354/152; 354/234; 354/288
[58] Field of Search ...................... 354/26, 36, 44, 152, 354/153, 156, 202, 243, 244, 271, 288, 234

[56] References Cited

U.S. PATENT DOCUMENTS

| | | | |
|---|---|---|---|
| 2,988,973 | 6/1961 | Bohm et al. | 354/152 |
| 3,608,460 | 9/1971 | Shimomura | 354/152 |
| 3,636,846 | 1/1972 | Singer | 354/153 |

Primary Examiner—Russell E. Adams
Attorney, Agent, or Firm—Toren, McGeady and Stanger

[57] ABSTRACT

In a single lens reflex camera an electromagnetic release initiates operation of an automatic diaphragm control, a mirror driver, and a shutter driver, in that order. The electromagnetic release device includes a mechanical output terminal for controlling each mechanism and an electric input terminal. The electromagnetic release device is provided in a flat space above the bottom exterior wall of the camera.

2 Claims, 17 Drawing Figures

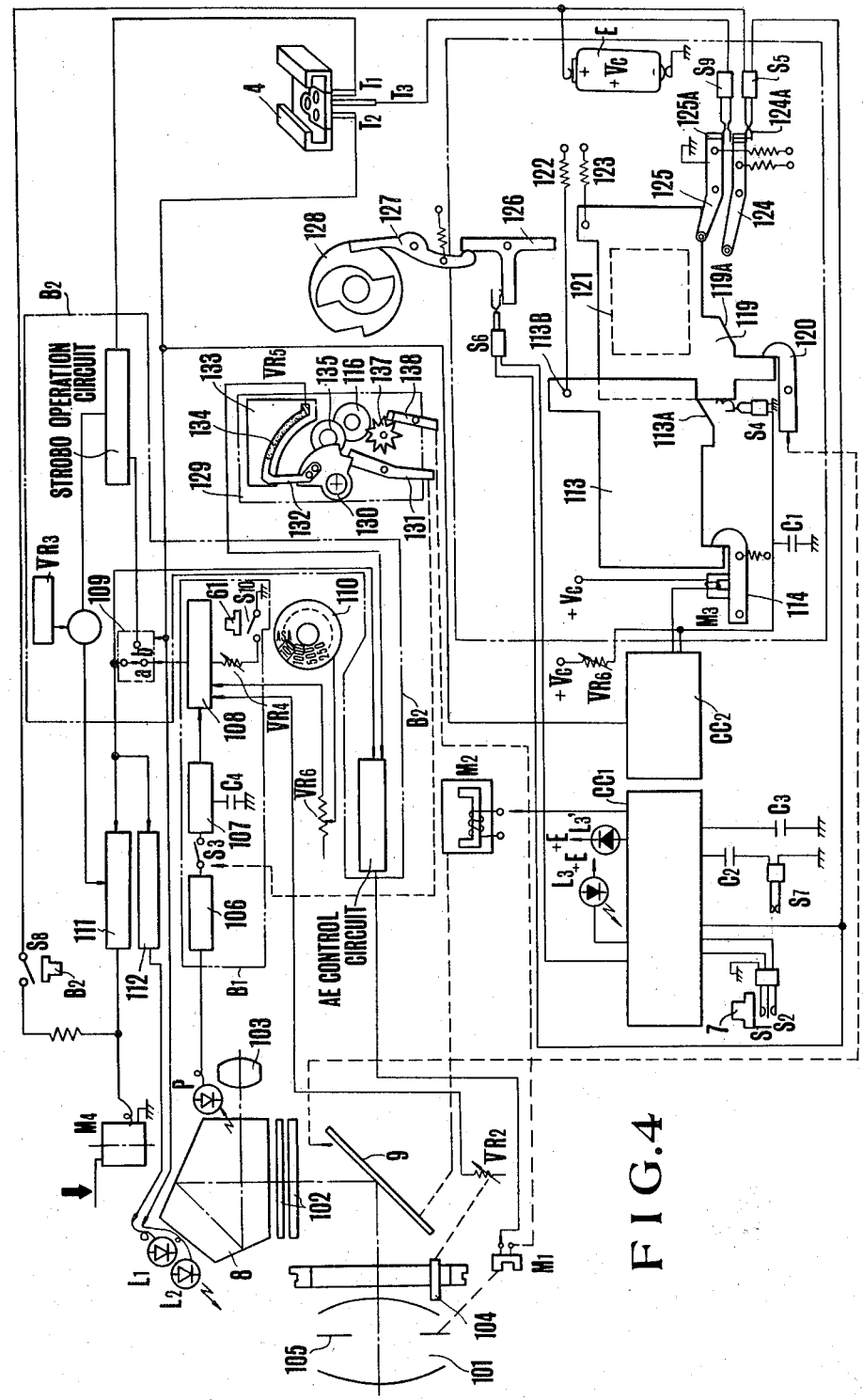
F I G. 4

SINGLE LENS REFLEX CAMERA WITH ELECTROMECHANICALLY INITIATED DIAPHRAGM AND SHUTTER CONTROL

This is a continuation of application Ser. No. 593,301 filed July 7, 1975, now U.S. Pat. No. 4,062,028.

BACKGROUND OF THE INVENTION

This invention relates to a single lens reflex camera whose internal mechanism is compose of separate units, and particularly to a single lens reflux camera in which electromagnetic control units such as electromagnetic release devices are mounted in dust-free and magnetically-shielded spaces.

DESCRIPTION OF THE PRIOR ART

A conventional single lens reflex camera includes a central portion that forms a mirror box in which a driving mechanism drives the mirror that forms part of the built-in viewfinder optical system. A film loading chamber and a winding chamber are provided in the left and right sides of the camera. The upper part of the camera contains a film winding mechanism as well as a film rewind mechanism. The portion near the central part of the film winding chamber also contains a shutter driving mechanism. The bottom of the camera contains an automatic diaphragm control mechanism. Thus, most of the space of the camera is occupied by mechanisms essential to the operation of the camera. This makes the construction of the camera quite complicated. This is especially so because the release equipment is mechanically engaged with the release button which actuates the quick return mirror and the automatic diaphragm mechanism. Thus the space in the camera needed for this release mechanism is necessarily large while the number of components for this mechanism is also large. This makes the construction all the more complicated. Furthermore, with electromagnetic release equipment, the release device itself is highly sensitive. Thus the device can be driven by a pulse of current from a small power battery capable of being contained in the camera. Several factors produce aging effects such as a reduction in the power of the magnetic attracting force of the electromagnetic equipment. One of these factors is dust. Another is powdered iron which may be distributed in the neighborhood of the release device and adhere to the armature of the magnetic pieces.

Furthermore, if the electromagnetic release device is subject to a magnetic flux component from an external magnetic field, or the magnetic field is induced by the electromagnet built into the camera in such a manner that a disturbing magnetic flux is induced in the magnetic portion, the resulting attractive force of the magnetic piece holding the armature is decreased. This may cause the shutter to be released unintentionally. This is also quite disadvantageous.

An object of the present invention is to provide a camera in which the camera mechanisms are composed of units or modules so as to make mounting in the camera easy.

Another object of the present invention is to eliminate the aforementioned shortcomings.

Still another object of the invention is to utilize the side portion of the space in the single lens reflex camera body, especially the small parallel space between the bottom plate of the camera body and the frame of the camera body.

SUMMARY OF THE INVENTION

According to a feature of the invention, these objects are attained in whole or in part by mounting the electromagnetic control units of the camera, such as the electromagnetic release device, in dust-proof casings, and shielding the casings where necessary.

These and other features of the invention will be pointed out in the claims forming a part of the specification. Other objects and advantages of the invention will be evident from the following detailed description of preferred embodiments when read in light of the accompanying drawings.

Further, other purposes of the present invention will be disclosed by the detailed explanation to be made later in accordance with the accompanying drawings of the embodiment of the present invention.

BRIEF DESCRIPTION OF THE DRAWINGS

FIG. 4 shows a block diagram for showing the camera shown in FIG. 1 as a whole.

DESCRIPTION OF THE PREFERRED EMBODIMENTS

Figure 1:
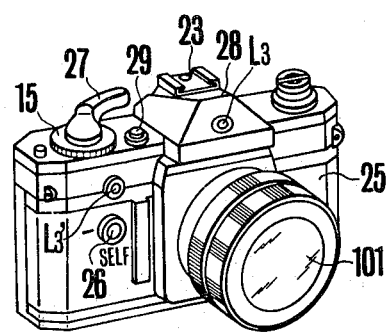
FIG. 1 shows an embodiment of the camera in accordance with the present invention in perspective view.

FIG. 1 shows perspective view of a single lens reflex camera in accordance with the present invention. Here member 25 represents the camera body, 101 the interchangeable lens, 28 the pentagonal roof prism, 23 the accessary shoe mounted on the prism part for the flash light device and 27 the winding up lever. A self timer setting dial 26 on the front face of the camera body sets the self timer circuit built in the camera body. The timer circuit is ready for operation when the dial 26 is set so that the index on the dial coincides with a fixed indicating mark on the camera body. An illuminating indicator diode $L_3'$ mounted on the front end face of the pentagonal roof prism 28 light, immediately before the start of operation of the camera but after the operation of the self timer. An illuminating diode $L_3$ mounted above the dial 26 indicator the photographic mode when the self timer is in operating. It is lit by the operation of the camera's release button 29 after the dial has been set to the position at which the self timer is ready for operation.

Figure 2:
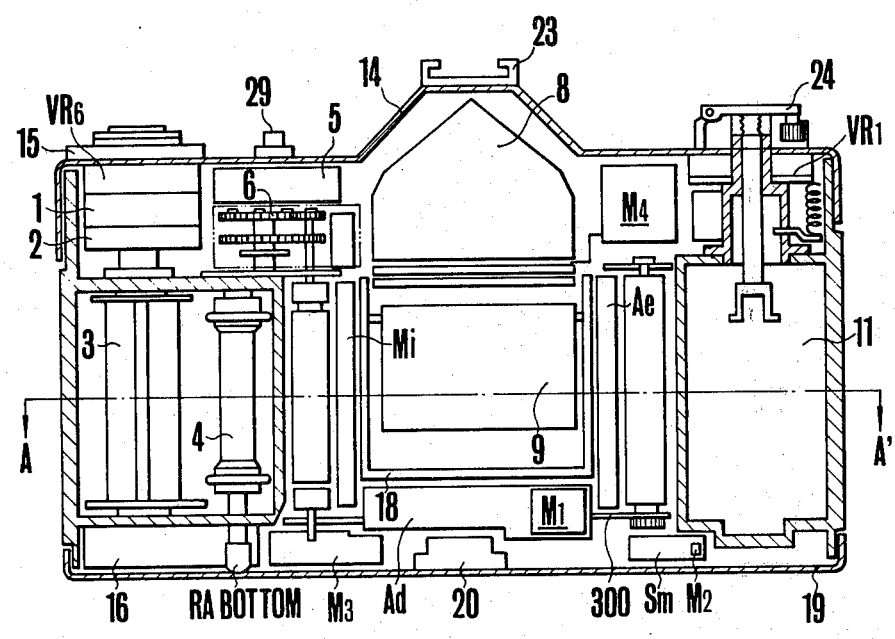
FIG. 2 shows the internal composition of the camera shown in FIG. 1.
Figure 3:
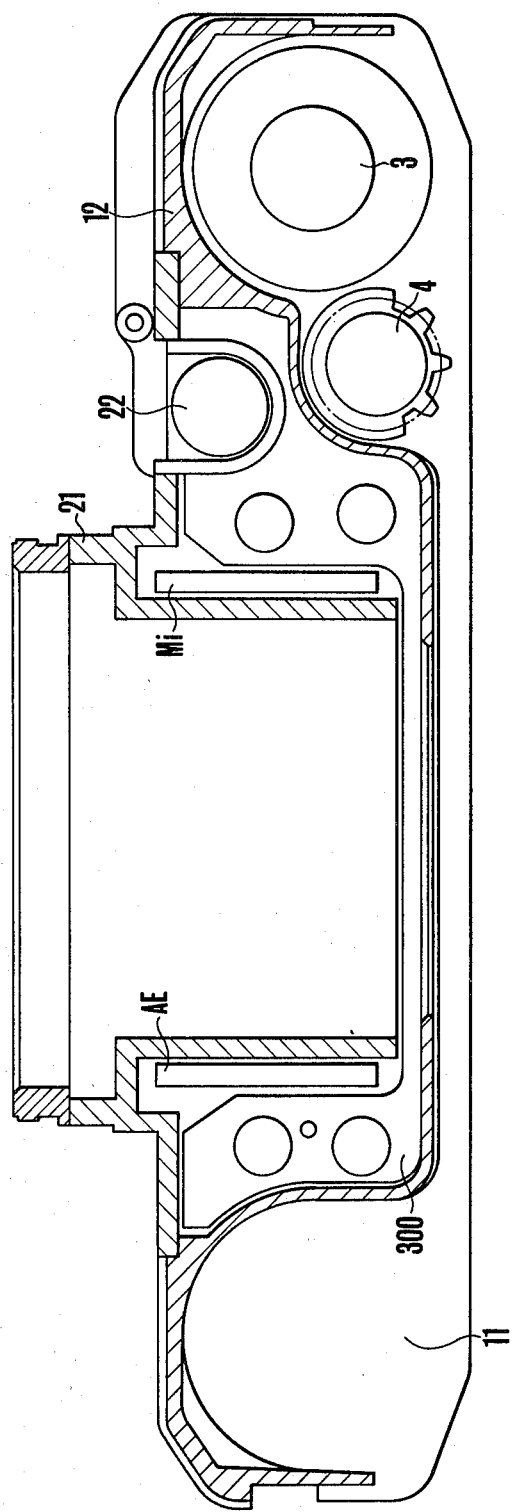
FIG. 3 shows a section along the line A–A' of FIG. 2.

FIGS. 2 and 3 respectively show the construction of important parts of the modules or units in the camera body shown in FIG. 1. Here, a resistance unit $VR_6$ includes a resistance for a time constant circuit which controls the shutter time. The value of the resistance can be varied by means of a shutter time setting dial 15. A switch block 1 contains a switch functionally engaged with the winding mechanism and the shutter mechanism. A clutch mechanism 2 conveys the winding power from a winding lever 27 to a winding mechanism 16 as well as a shutter charging mechanism. Below the clutch mechanism is a winding spool 3, and adjacent to the latter is a sprocket 4. An assembly 6 is composed of a shutter charging mechanism as well as a braking mechanism composed of a master gear, pinion gear, etc. in the focal plane shutter. A numerical figure disc unit 5 is provided above these mechanisms. A magnet $M_3$ controls the rear curtain of the focal plane shutter. In the parallel space between the mirror box containing the mirror 9 and the one end of an electronic shutter unit 300 is a mirror lifting mechanism unit Mi which contains the mirror lifting mechanism.

An automatic exposure control unit Ae is provided in the parallel space between the mirror box 18 and the other end of the electronic shutter unit. Further in the space closed by the lower face of the mirror box 18, the bottom cover 19 and the tripod mounting screw 20, the automatic diaphragm unit Ad is provided. At the one end of the automatic diaphragm unit Ad at the side of the automatic exposure control unit Ae is the magnet $M_1$ for automatic exposure control. In the space closed by the bottom of the cartridge chamber 11, the bottom of the electronic shutter unit 300 and the bottom cover 19, the camera release unit Sm and the magnet $M_2$ are provided. The electronic shutter unit 300 provided in the space closed by the pinion drum 7, the side wall of the camera frame body 12 and the front plate 21 is capable of containing the battery 22 serving as the current source for the automatic exposure control mechanism and so on. On the so called upper cover 14, the pentagonal prism 8, the indication meter $M_4$, the processing resistance $VR_1$, the winding back crank 24 and so on are provided as shown in the drawing, beside the components such as the above mentioned $VR_6$, the numerical figure disc and so on. The upper cover containing the pentagonal prism 8 also contains the accessary shoe 23.

Figure 5:
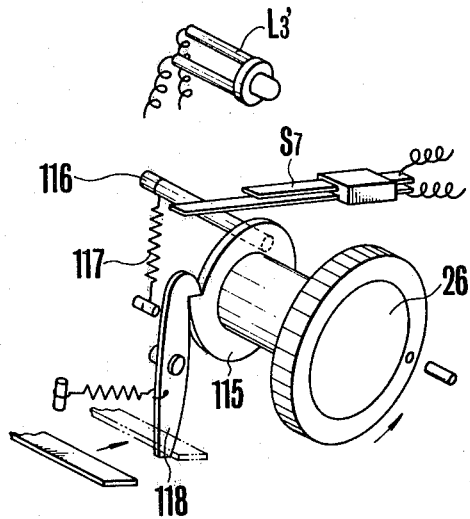
FIG. 5 shows the composition of the self timer setting dial shown in FIG. 1.

FIG. 4 is a block diagram of the camera shown in FIG. 1. Here member 9 is the quick return mirror, 102 and 103 respectively Fresnel lenses, the focus plate as well as eye piece lens forming a conventional single reflex view finder optical system, P the light sensing diode element such as SBC provided over the eye piece lens, $L_1$ and $L_3$ the alarm indicating illumination diodes provided in the neighborhood of the pentagonal prism 8, and 104 the single member provided on the rear end face of the interchangeable lens 101. The length of the signal member 104 along the optical axis corresponds to the maximum aperture value of the lens and serving as the signal pin for compensating the error produced during TTL totally opened light measurement when it is set at the maximum aperture value of the automatic diaphragm 105 provided in the interchangeable lens 101. Member $VR_2$ is the variable resistance whose value is automatically set by means of the signal member 104, and $B_1$ the light measuring circuit block consisting of the light measuring circuit 106. The latter represents an input connected with the light sensing member P. A storage circuit 107 is connected by means of the storage switch $S_3$ which is opened and closed by means of the magnet $M_2$ and the processing circuit 108. Thus the output of the above mentioned block is connected with the automatic exposure deciding circuit block $B_2$ by means of the photographic mode switching over switch 109. The contact a of the switching over switch 109 is for the day light photographic mode, while the contact b is the flash light photographic mode. Hereby $B_1$ of the light measuring block $B_1$ is the K value button to be operated at the time of taking special photograph at the improper exposure value being shifted by a certain determined number of steps from the proper exposure value, whereby its detailed explanation is omitted. Member 15 is the shutter dial electrically wired so that the value of the variable resistance $VR_6$ is set by setting the dial so that the shutter time information is put in the processing circuit 108. The automatic exposure deciding circuit block $B_2$ further presents an input to be connected with the output of the processing circuit 108 by means of the switching over switch. Further, the automatic exposure deciding circuit block $B_2$ connects the indicator driving circuit 111 with the alarming circuit 112, connecting the meter $M_4$ with the illuminating diode $L_1$ respectively $L_2$, so that the diaphragm value at the time of taking photograph is indicated in advance by means of the indication finger of the meter $M_4$ while in case no proper exposure can be obtained with the set shutter time, either the illuminating diode $L_1$ or $L_2$ is lighted up selectively so as to alarm the over-exposure or the under-exposure, whereby the detailed explanation is omitted here because such composition has nothing direct to do with the present invention. An electromagnet $M_1$ connected with the output of the automatic exposure deciding circuit controls the aperture deciding mechanism to be explained later. Structure $CC_1$ is the control circuit presenting the block for controlling the magnet $M_2$ for starting the operation of the camera ($B_3$), the mono-stabilized circuit block ($B_4$) and the indication control circuit block ($B_6$) shown as the control block $B_3$, $B_4$, $B_6$ (to be explained later in accordance with FIG. 6), whereby said block is connected with the illuminating diodes $L_3$, $L_3'$. Apparatus $CC_2$ is the control circuit presenting the control blocks $B_5$ and $B_7$ (to be explained in accordance with FIG. 6). Member $M_3$ is the electromagnet for controlling the stopping member of the rear focal plane 113, being connected with the output of the control circuit block $B_5$. Member $S_1$ and $S_2$ are the switches so arranged as to be in functional engagement with the shutter release button 29, whereby the switch $S_1$ is closed by operating the release button 29 down to the first step while the switch $S_2$ is closed by further operating the release button 29 down to the second step whereby both switches are opened by returning the shutter release button 29. Member $S_7$ is the switch in functional engagement with the self timer setting dial 26 as is shown in FIG. 5, so as to be closed by means of the pin 116 provided on the cam piece 115, whereby the pin 116 is equipped with the spring 117 forcing the cam plate clockwise while the stopping lever 118 being forced so as to come close to the cam engages with the stopping part of the cam 115.

On the other hand, the stopping lever presents the end part being prolonged into the trace of the member moving to and fro in functional engagement with the winding up mechanism not shown in the drawing, so that by charging operation after taking photograph with the self-timer the stopping lever 118 is disengaged from the cam piece 115 in such a manner that the pin 116 is rotated clockwise by means of the effect of the spring 117, so as to rotate the dial 26 clockwise. As the result, the switch $S_7$ is brought into the opened state, while the setting dial 26 is reset from the self-timer mode. When the next photograph is to be taken after a photograph has been taken with the setting dial 26 set for the self-timer mode, the self-timer setting dial is reset by the winding up operation so that there is no danger that the next photograph could be taken with the self-timer mode, forgetting to reset the dial 26. Member 119 is the front focal plane curtain while 120 the front focal plane stopping member, being so designed as to be, similarly to the conventional single lens reflex camera, in functional engagement with the mirror 101 and to be disengaged from the front focal plane 119 at the time point at which the mirror is lifted up. 121 is the exposure frame, 122 and 123 respectively the spring for the driving the front focal plane and that for driving the rear focal plane, 124, the switching over lever to be engaged with the cam part 119 of the front focal plane 119 and displaced, 125 the switching over lever to be engaged with the cam part 113A of the rear focal plane 113 and displaced, whereby the levers 124 and 125 present a switch $S_5$ at the bent part 124A of the end respectively a switch $S_9$ at the bent part 125A of the end. 126 is the switching over lever to be rotated by the end 113B of the rear focal plane so as to bring the switch $S_6$ out of the closed state into the opened state, while 127 engages with the switching over lever 126 with the one end and with the cam 128 to be rotated by 180° in functional engagement of the charging mechanism with the other end. Member 129 is the aperture deciding mechanism provided side face of the box for the mirror 101 in the camera body, while 130 is the main driving sector gear being forced clockwise by means of a spring not shown in the drawing whereby the end face is prevented from rotating by means of the stopping lever 131, 132 is the sliding member fixed on the sector gear, being designed so as to make a sliding contact on the resistance layer cemented on the insulation plate 133 and to compose a variable resistance $VR_5$ to be connected with the deciding circuit $B_2$. Members 135–137 represent a speed up gear group composing governer gear whereby on the last wheel 137a stopping lever 138 whose one end is attracted by the electromagnet and whose other end prevents the wheel 137 from rotating. Hereby the sector gear 130 drives the cam piece for presetting the diaphragm provided in the interchangeable lens 2 by means of the connecting mechanism not shown in the drawing, whereby the detailed explanation is omitted because the composition has nothing direct to do with the present invention. $S_8$ is the switch to be closed in functional engagement with the button $B_2$ for checking the voltage of the battery E as current source.

Figure 6:
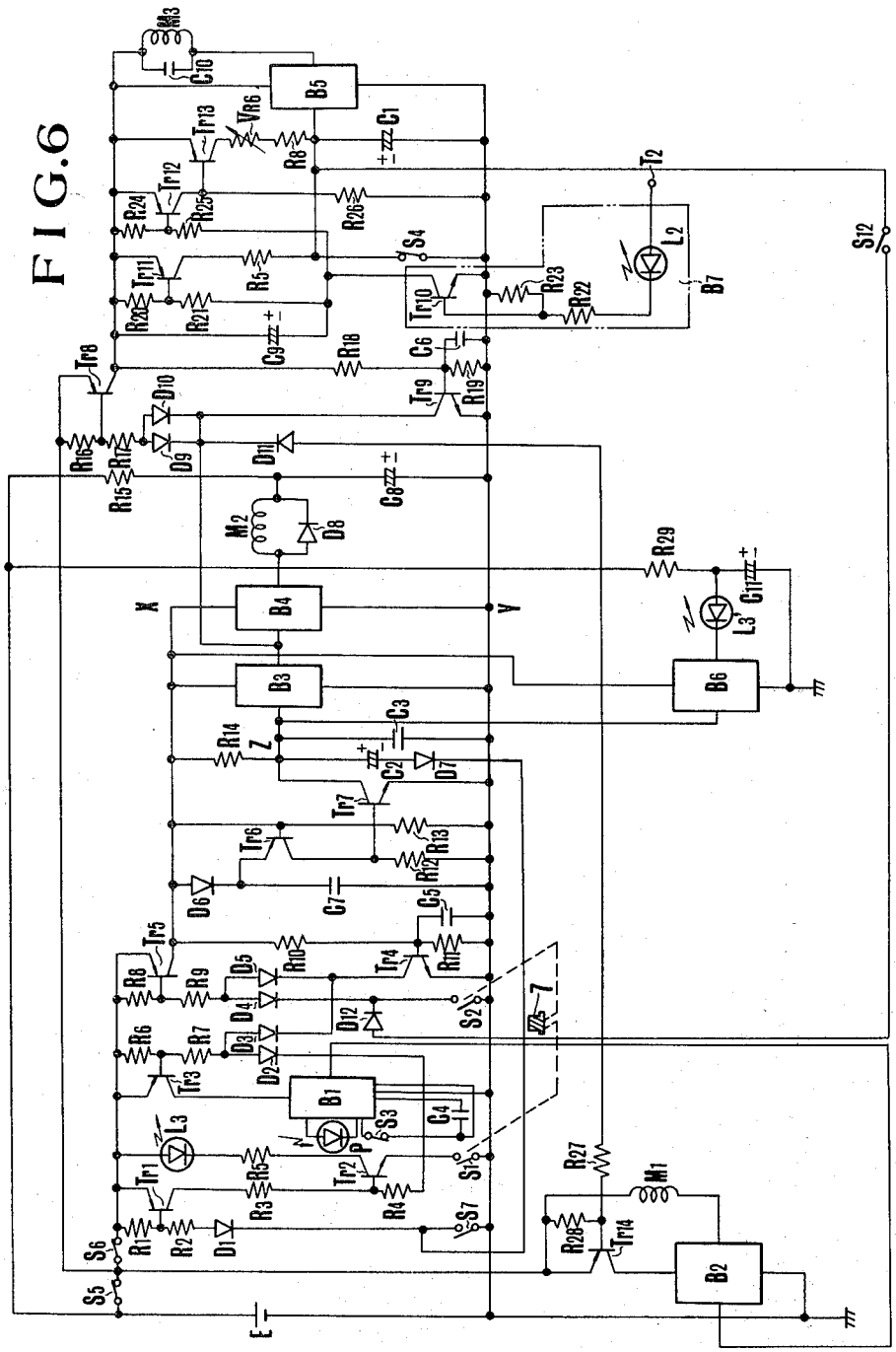
FIG. 6 shows the diagram of the electrical control circuit of the camera shown in FIG. 4.
Figure 7:
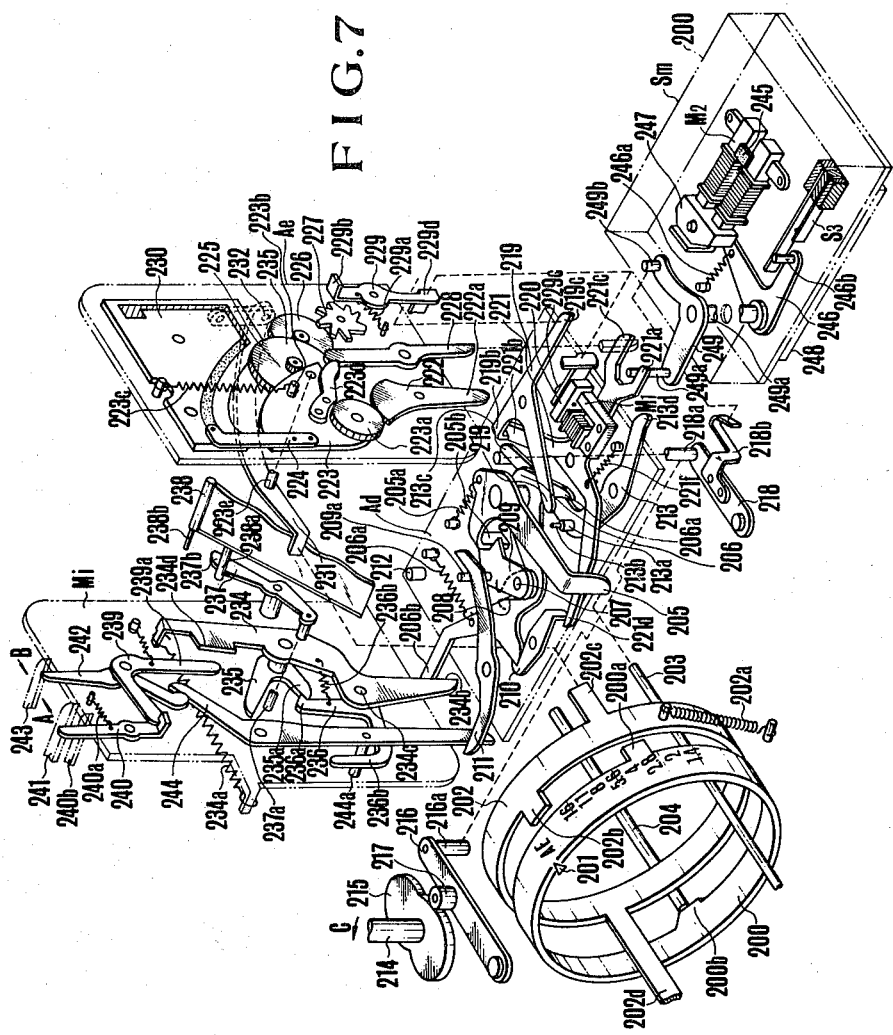
FIG. 7 shows concretely the composition of the units in the camera body, especially in the neighborhood of the mirror box and that of the photographic lens in perspective view.

FIG. 6 illustrates the control circuit of the assembly in FIG. 7 which also includes the electrical components such as the switches $S_1$–$S_{10}$, the condensers $C_1$–$C_{10}$, the resistance $VR_1$–$VR_6$, the electromagnets $M_1$–$M_8$. In FIG. 6, resistors $R_1$ and $R_2$ form a voltage divider, a diode $D_1$ prevents return current, and the base of a transistor $Tr_1$ is connected with the voltage dividing point of the voltage divider $R_1$ and $R_2$. Transistor $Tr_2$ is a diode driving transistor whose base is connected with the voltage dividing point of voltage dividing resistances $R_3$ and $R_4$. The latter voltage dividing point is connected with the collector of the transistor $Tr_1$ whose collector circuit contains an illuminating diode $L_3$ for indicating the self-timer setting. A capacitor $C_4$ is connected in the storage circuit 107 for storing the brightness value of the object to be photographed. A storage switch $S_3$ is coupled to the electromagnet $M_2$ for releasing the mirror quick return mechanism not shown in the drawing and to be opened before the mirror is lifted up. The storage switch $S_3$ is connected with the light measuring circuit and the storage circuit in the block $B_1$. It stores the brightness value of the object to be photographed, immediately before the lifting of the mirror in the condenser, as an electrical signal. A transistor $Tr_5$ has a base connected with the voltage dividing point of the voltage dividing resistances $R_8$ and $R_9$, which is connected with the switch $S_2$ and the collector of the holding transistor $Tr_4$ by means of the return current preventing diodes $D_4$ and $D_5$ connected in parallel to each other. Transistor constitutes an efficient current supply switch for supplying current to the control blocks $B_3$ and $B_4$ only in case of necessity. It is switched on by closing the switch $S_2$. The latter is closed operating the shutter button 29 down to the second step. This turns on the transistor $Tr_4$ through the resistance $R_{10}$. Due to the switched on state of the transistor $Tr_4$ the base potential of the transistor $Tr_5$ is kept at a low level. Thus the transistor $Tr_5$ is locked in the switched on state even when the switch $S_2$ is returned to the opened state. A resistor and capacitor $R_{14}$ and $C_3$ form a delay circuit for delaying the start of the camera during the light measuring operation especially when taking photographs repeatedly. The time constant of the circuit $R_{14}$ and $C_3$ is about 10 mSec. A capacitor $C_3$ for setting the time of the self-timer is connected parallel to the condenser $C_3$ and with the timer setting switch $S_7$ through the return current preventing diode $D_7$. Transistors $Tr_6$ and $Tr_7$ discharge the charges in the condensers $C_2$ and $C_3$ and reset them. The capacitor $C_7$ serves for controlling their discharging time. A capacitor $C_8$ charges through a resistor 15 and holds the charge for quickly exciting an operation starting electromagnet $M_2$. The output of the control block $B_3$ is connected with the base of the transistor $Tr_{14}$ by means of the diode $D_{11}$ and the resistance $R_{27}$. A current supply controlling transistor $Tr_{14}$ is connected in the current supply circuit of the control block $B_2$. The control block $B_6$ whose input is connected with the condenser $C_2$ and $C_3$ is the block for predicting the operation of the self-timer, consisting of a conventional switching circuit, whose conductivity level is a little lower than the threshold value of the conventional switching circuit composing the input part of the control block $B_3$. A capacitor $C_{11}$ charges through a resistor $R_{29}$ and stores the energy for lighting an illuminating diode $L_3'$. A start switch $S_4$ is closed before the start of the front shutter curtain by the end face of the front shutter curtain shown in FIG. 4. It is opened at the start of operation of the front shutter curtain. A capacitor $C_1$ sets the shutter time and formed of a time constant circuit with the variable resistance $VR_6$ whose value is set by means of the shutter dial. Member $Tr_8$ and $Tr_9$ are the transistors for controlling the current supply to the control block $B_5$. The base of the transistor $Tr_8$ is connected with the voltage dividing point of the voltage dividing resistances $R_{16}$ and $R_{17}$, while its collector is connected with the collector of the transistor $Tr_9$ by means of the diode $D_{10}$. The base of the transistor $Tr_9$ is connected with the voltage dividing point of the voltage dividing resistances $R_{18}$ and $R_{19}$. The transistor $Tr_8$ is turned on, i.e. rendered conductive, when the transistor $Tr_9$ is brought into the conductive state so as to be lower than the base level of the transistor $Tr_8$. An illuminating diode $L_2$ is connected to the accesary shoe terminal $T_2$ of the camera. It is connected in the neon tube circuit of a conventional electronic flash light. The connection is such that when the charge voltage of the main capacitor at the electronic flash device reaches a predetermined value, the diode illuminates. This renders the transistor $Tr_{10}$, whose base is connected with the diode conductive state. A control circuit block $B_7$ produces a control signal for automatically setting the shutter time for a flash operation in response to a signal for the completion of the charging of the flash device. The collector of the transistor $Tr_{10}$ is connected with the transistor $Tr_{11}$. Thus when the transistor $Tr_{10}$ is switched on, the transistor $Tr_{11}$ turns on so that the resistance $R_5$ is connected in series with the condenser $C_1$. On the other hand due to the switched on state of the transistor $Tr_{10}$, the transistors are off, in such a manner that the shutter time is set at a time such as for example, 1/60 sec. which is determined by the time constant circuit consisting of the resistance Rs and the condenser $C_1$, so as to be suited for taking photograph under flash light.

A capacitor $C_9$ connected with the transistor $Tr_{10}$ delays return of the flash shutter time to daylight time. The capacitor 9 is charged in the conductive state of the transistor $Tr_{10}$ in order to prevent the charge completion signal from becoming instantly unstable when the flash device operates.

Under these circumstances, after the self-timer setting dial 26 has been set, pushing down the shutter release button 29 to its first step closes the switch $S_1$. Because switches $S_5$ and $S_6$ have already been closed, the transistors $Tr_1$ and $Tr_2$ are turned on. This illuminates a light emitting diode $L_3$ to indicate to the photographer that the photograph is being taken in the self-timer mode. During time, the light sensing element P produces an electrical signal corresponding to the brightness of the object to be photographed by means of the light passing through the interchangeable lens 2, which signal is stored in the storage condenser. Before taking a photograph, the shutter time has been set by the variable resistance $VR_6$ in engagement with the shutter dial 15. Thus processing circuit 108 is ready for processing the aperture value for obtaining the proper exposure value.

When the shutter button 29 is pushed down further, the switch $S_2$ closes and turns on the transistor $Tr_5$. At the same time, the holding transistor $Tr_4$ also turns on and locks the transistor $Tr_5$ in its conductive state. As a result the control blocks $B_3$ and $B_4$ are energized by the current supply E. The energizing current causes the transistor $Tr_7$ to be switched off. Thus, the time constant circuit consisting of the condensers $C_2$, $C_3$ and the resistance $R_{14}$ starts charging. When the charge voltage of the condensers $C_2$ and $C_3$ rises to a level immediately before the operation of the control block $B_3$, the control block $B_6$ is switched on and the light emitting diode $L_3'$ lights due to the charge stored in the condenser $C_{11}$. The shutter release button is freed when the switch $S_1$ is opened. Therefore unnecessary power consumption can be avoided while the lights diode $L_3'$ illuminate during the time proportional to the charge stored in the condenser $C_{11}$ and then goes out.

When the charge level of the condensers $C_2$ and $C_3$ rises further after the diode $L_3'$ illuminates, the control block $B_3$ operates so as to trigger the monostable multivibrator circuit $B_4$. As the result rectangular driving pulses are applied to the electromagnet $M_2$. This releases the mirror quick return mechanism. At this time, the output signal of the control the current supply to the control block $B_3$ turns on transistor $Tr_{14}$ and starts.

In response to release of the mirror mechanism, the stopping lever 134 frees the sector gear 130, so that the sliding member 132 starts to rotate clockwise. In accordance with the resistance input of the variable resistance $VR_5$ composed of the sliding member 132 and the resistance 134, the brightness data of the object to be photographed stored in the storage condenser, and the set shutter time data, the sector gear rotates into a position corresponding to the aperture value for a predetermined proper exposure. When the electromagnet $M_1$ is excited by the control block $B_2$ the wheel is stopped by the stopping lever 138 in such a manner that the mechanism in functional engagement with the sector gear 130 for presetting the diaphragm of the interchangeable lens is set at the position at which the aperture is set at a predetermined value. On the other hand, operation of the control block $B_3$ turns on the transistor $Tr_8$ so that the current supply to the control block $B_5$ is rendered effective. When the stopping member 120 in functional engagement with the mirror driving mechanism frees the front focal plane after the mirror is lifted up, the shutter is opened. Thus before the shutter opening and during the lifting up of the mirror the automatic diaphragm mechanism has already closed down the diaphragm 105 at the lens to the above mentioned preset aperture value.

At the start of the front focal plane the switch $S_4$ is opened so that the condenser $C_1$ starts charge through the resistance $VR_6$. At the position at which the front focal plane is totally opened, the switch $S_9$ is closed. When after the elapse of a given time, the electromagnet $M_3$ is demagnetized, the rear focal plane is freed so as to close the shutter. During shutter closing, the switch $S_5$ is switched off by the rear curtain. All the transistors $Tr_5$, $Tr_8$ and $Tr_{14}$ supplying current to the control blocks are switched off so that no more current is supplied to the control blocks. In consequence, power is supplied to the control blocks only in case of necessity, and thus can be kept minimum.

When the flash device is mounted on the accesary shoe 23 of the camera, the charge voltage of the main capacitor of the speed light device is detected by means of a conventional voltage detecting circuit such as neon tube. The output is applied to the diode $L_2$ by means of the terminal $T_2$. As a result, the diode lights, the transistor $Tr_{10}$ is switched on and the transistor $Tr_{13}$ is switched off. Thus the time constant circuit for the input of the control block $B_5$ is composed of the resistance Rs and the condenser $C_1$. By means of the then time constant the shutter time is set for flash photography.

The operation after that is carried out as explained above. When the shutter is wound for the next photograph after the operation of the self-timer, the stopping lever 118 is disengaged. Thus the dial 26 is rotated by means of the effect of the spring 117 while the switch $S_7$ is switched off by means of the pin 116. This is done so that that it is necessary to set the dial 26 again in order to take the next photograph with the self-timer. Hence the eliminates mistakenly taking a photograph with a self-timer instead of the ordinary photographic mode because the self-timer has be reset with the winding operation.

In the ordinary day light photographic mode the switch $S_7$ is switched off. Hence the time constant circuit to be connected with the input of the control block $B_3$ is composed of the resistance $R_{14}$ and the condenser $C_3$. Thus before the transistor $Tr_5$ is switched on in connection with the shutter release operation, the capacitors $C_2$ and $C_3$ have been discharged due to the charge in the condenser $C_7$. After delay of time $R_{14} \times C_3$ due to the switched on state of the transistor $Tr_5$, the control block $B_3$ operates. Operation continues until the electromagnet $M_2$ is operated in so that the minimum time needed for the light measuring is obtained so as accurately to measure the brightness of the object to be photographed.

A switch $S_{12}$ connected between the condenser $C_1$ and the switch $S_2$ through the return current preventing diode $D_{12}$ is closed by setting the shutter dial 15 at "B" photography, with the variable resistance $VR_6$ set at a proper resistance value. When the shutter release button is pushed down, while the dial 15 is set at "B", condenser $C_1$ discharges through the switch $S_{12}$ and the diode $D_{12}$, and only the front focal plane runs. Thus the shutter is kept open. When the button 29 is freed the switch $S_2$ is opened. Now the condenser $C_1$ starts charge through the resistance $VR_6$. Thus the electromagnet $M_3$ is excited after a specific time so that the rear curtain 113 runs to close the shutter, thereby completing the "B" photography.

FIG. 7 shows a perspective view of the units in the camera body, especially in the neighborhood of the mirror box and of the photographic lens, with the film wound up and the shutter charged. A diaphragm ring 200 is provided with an automatic diaphragm index AE and the manual diaphragm index as well as a projecting part 200a and cam part 200b. Index serves for alignment of the automatic diaphragm index AE and the manual diaphragm index. Diaphragm presetting ring 202 is forced clockwise by a spring 202a and carries a projecting part 202b capable of engaging the projecting part 200a of the diaphragm ring 200.

Further, the ring 202 carries an arm 202c, deciding the rotation of a bell crank by means of the lever 202d provided on the diaphragm presetting ring 202, through the diaphragm setting cam ring not shown in the drawing. This bell crank is intended to decide the aperture by controlling the rotation of the diaphragm driving ring not shown in the drawing. A pin 203 on the above mentioned diaphragm driving ring engages the automatic diaphragm lever 205 which is biased counterclockwise by a the spring 205a of the automatic diaphragm unit. This automatic diaphragm lever 205 includes a bent part 205b. An automatic—manual switching over signal pin is movable in response to the operation for aligning the index AE of the above mentioned diaphragm ring 200 and the manual diaphragm index with the index 201. Rotatably pivoted on the automatic diaphragm lever 205 is an automatic diaphragm energy storing lever 206. The automatic diaphragm energy storing lever 206 is forced clockwise by means of the effect of the spring 206a. A shaft in the middle of the one part of the lever a shaft 207 supports a common lever 209 biased by a spring 208. The end of this common lever 209 engages the part 205b of the above mentioned automatic diaphragm lever 5, and carries a pin 209a. Further, the automatic diaphragm energy storing lever 206 encounters a stopping claw 210 for keeping the strength of the spring 206a. An automatic diaphragm return signal lever 211 includes one end that engages the pin 209a of the above mentioned common lever 209. A stopper pin 212 limits the rotation range of the automatic diaphragm energy storing lever 206. A charging lever 213 charges the spring 206a of the above mentioned automatic diaphragm energy storing lever 206 when the step 213a of the pin provided in the middle of the charge lever 213 engages the automatic diaphragm energy storing lever 206.

In order to charge the charge lever 213 in functional engagement with the winding up operation, a charge cam 215 integral with the shaft 214 which is mechanically linked with the wind-up lever not shown in the drawing moves an intermediate charge transmitting lever 216 through a roller 217 and the pin 216a provided on the intermediate lever 216. Further opposed to the charging lever 216 an intermediate lever 218 connected with the connecting member not shown in the drawing is provided with a pin 218a. A magnet charge plate 218b composed of elastic body is fixed to the center of lever 218. Member 219 is three forked lever serving as the charge member for attracting the armature 220 toward the automatic exposure control magnet $M_1$, whereby the one end 219a of the member engages with the step 213b of the pin of the above mentioned charge lever 213 while the other end 219b is stopped by means of the hook part 221b of the release lever 221. The third end engages with the 229d of the stop wheel claw 229 to be explained later. The release lever 221 also presents a three forked shape and is forced anticlockwise by means of the spring 221f.

The automatic exposure control unit Ae is provided with a charge gear 222 to be engaged with the above mentioned charge lever 213. Fixed on the sector gear 223 the gear 223a engageable with the charge gear 222, are the sliding member 224 for the resistance and the Ae stopping plate 223d. The sector gear 223 engages with the speed up gears 225, 226 and the stop wheel 227. The spring 223c of the pin 223b provided on the sector gear 223 forces the sector gear 223 anticlockwise. The spring 223c is weaker than the spring 202a at the above mentioned lens. An Ae stopping lever 28 has one end stopped by the stopping plate 223d of the sector gear 223 and another end which engages the fork part 221c of the above mentioned release lever 221. A stop wheel claw is forced counterclockwise by the spring 229a. One end has a claw part 229b for stopping the rotation of the stop wheel 227, while at the other end, the above mentioned armature 220 is pivoted by means of the shaft 229c. Member 230 is the automatic exposure control resistance $VR_5$. 231 is the signal lever whose one end engages with the arm 202c of the above mentioned diaphragm presetting ring 202 whereby in the middle part the pin 223e provided on the sector gear 223 is pivoted while the other end is pivoted on the support lever 232. The mirror lifting mechanism unit Mi presents a mirror driving lever 234 engageable with the end 206b of the above mentioned automatic diaphragm energy storing lever 206, whereby the upper bent part of the lever 234 is formed anticlockwise by means of the effect of the spring 234a. The mirror kicking up lever 235 is pivoted coaxially with the mirror driving lever 234, being engaged with the hook part 236a of the kicking up stopping claw 236 pivoted on the shaft 234c provided on the mirror driving lever 234. Hereby the kicking up stopping claw 236 presents a spring 236b forcing clockwise. The mirror kicking up lever 235 engages with the pin 237a provided at the one end of the kicking up intermediate lever 237, while the other end 237b engages with the pin 238a provided on the mirror receiving plate 238. (238b is the rotary shaft of the mirror receiving plate 238.) Further the above mentioned mirror driving lever 234 presents a convex part 234d engaging with the end part 239a of the front focal plane stopping lever 239 while the other end is stopped by the rising up part of the front focal plane release lever 240. The upper end of the front focal plane release lever 240 engages with the front focal plane keeping lever 241 for actuating the start of the front focal plane of the shutter mechanism. 240b is the set lever for charging the spring 240a, in functional engagement with the winding up mechanism not shown in the drawing. The rear focal plane signal lever 242 is independently pivoted coaxially with the front focal plane stopping lever 239, engaging with the signal lever 243 operating by means of the termination signal of the rear focal plane of the shutter mechanisms. The other end of the lever 242 engages with the upper end part of the mirror return signal lever 244, while the pin 244a provided in the middle of the mirror return signal lever 244 engages with 236b of the above mentioned kicking up stopping claw 236. Further, the lower end part of the mirror return signal lever 244 also engages with the end part of the automatic diaphragm return signal lever 211, existing in the above mentioned Ad unit. In the camera release unit Sm a magnet $M_2$ with a permanent magnet whereby 245 is the permanent magnet. For the magnet $M_2$ with the permanent magnet the armature holding lever 246 is provided so as to hold the armature 247. The armature holding lever 246 is forced anticlockwise by means of the effect of the spring 246a, being designed stronger than the spring 221f of the above mentioned release lever 221 but weaker than the attractive force of the permanent magnet 245. Further, a pin 246b is provided on the one end of the armature holding lever 246 and engages with the storage switch $S_3$. Hereby the camera release unit Sm is a frame body 200 consisting of a magnetic material, serving as the casing for the magnet $M_2$, the armature holding lever 246, the storage switch $S_3$ and so on, whereby on the lower surface of the casing a shielding material 248 for shielding the magnetic influence is provided. Further the camera release unit Sm is designed as casing as the whole so that the armature holding lever 246 is connected with the start signal lever 249 for taking out the signal from the armature holding lever 266 by means of the shaft 249a. The pin 249a provided at the one end of the start signal lever 249 engages with 221a of the above mentioned release lever 221, while the pin 249b provided at the other end engages with the magnet charge plate 218b of the above mentioned intermediate lever 218.

The structure of FIG. 7 operates as follows:

When the AE index of the diaphragm ring 200 is moved into coincidence with the index 201, namely the exposure is controlled automatically, and the shutter button 29 at the side of the above mentioned camera is pushed down, current is supplied to the camera release unit Sm from the current source. Thus a current flows through the coil so as to weaken the magnetic force of the permanent magnet 245 so that the armature holding lever 246 is rotated counterclockwise by means of the spring 246a. The pin 246b now opens the storage switch $S_3$. The signal start lever 246 provided outside of the casing is constructed to rotate with the armature holding lever 246 and therefore rotates counterclockwise. The pin 249a conveys the rotation to the forked part 221a of the release lever 221 of the automatic diaphragm unit Ad. The release lever 221 is rotated clockwise against the force of the spring 221f. In accordance with the amount of rotation at first the hook 221b disengages from the protuberance 219b of the three forked lever 219.

At this time, a current is supplied to the magnet $M_1$ for controlling the automatic exposure in functional engagement of the operation of the shutter button 29. Thus the three forked lever 219 is attracted by the stop wheel claw 229 of the automatic exposure control unit Ae against the force of the spring 229a. Hence, until the current supply is stopped, even if the above mentioned three forked lever 219 is disengaged, it does not operate. When the release lever 221 is further rotated, the fork part 221c rotates the Ae stopping lever 228 clockwise. Thus the stopping plate 223d of the sector gear 223 is disengaged in such a manner that the sector gear 223 starts to rotate by means of the effect of the spring 202a of the diaphragm preset ring at the lens. Rotation of the gear 223 occurs through the signal lever 231 against the force of the spring 223c. The gears 225, 226 and the stop wheel 223 in engagement with the sector gear 223 are rotated at higher speeds. At the same time, the resistance sliding member 224 of the sector gear 223 also slides along the surface of the $VR_5$ resistance 230. When the above mentioned automatic exposure unit Ae is released the automatic exposure is determined by the signal of the photographic information explained in accordance with FIGS. 4 and 6 and the resistance value of $VR_5$. This occurs in such a manner that the current supply to the automatic exposure control magnet $M_1$ is interrupted. Hence the stop wheel claw 229 is rotated anticlockwise i.e. counterclockwise by the spring 229a, so as to stop the rotation of the stop wheel 227. The rotation position of the arm 202c of the diaphragm preset ring 202 engaging with the above mentioned signal lever is now controlled so as to decide the diaphragm value.

Nearly simultaneously with the disengagement of the Ae stopping lever 228 the end 221d of the release lever 221 rotates the stopping claw 210 anticlockwise. Thus automatic diaphragm energy storing lever 206 is disengaged and rotated clockwise by the spring 206a. In functional engagement with the rotation of the automatic diaphragm energy storing lever 206 the automatic diaphragm lever 205 is rotated clockwise through the common lever 209. This rotates the pin 203 of the diaphragm driving ring at the lens clockwise in such a manner that the diaphragm blades not shown in the drawing are narrowed.

The automatic diaphragm energy storing lever 206 rotates so that the end 206b releases the lower end part 234b of the mirror driving lever 234. The spring 234a now rotates the mirror driving lever 234 counterclockwise. The mirror kick up lever 235 coaxial with the mirror driving lever 234 rotates along the same direction. It contacts hook 236a of the kicking up stopping claw 236 and rotates the pin 237a of the kick up intermediate lever 237 anticlockwise, whereby the pin 237b at the other end flips up the mirror receiving plate 238 around the pin 238a.

When the mirror driving lever 234 is rotated the convex part 234d rotates the end part 239a of the front focal plane stopping lever 239 clockwise. Hence the hook part at the other end disengages from the protuberance of the front focal plane release lever 240 in such a manner that the release lever 240 rotates the front focal plane keeping lever along the direction of arrow A by means of the spring 240a so as to let the focal plane of the shutter mechanism not shown in the drawing start. Then the shutter mechanism operates with the set shutter time when the rear focal plane has run, the signal lever 243 is rotated along the direction of the arrow B by the shutter completion signal. Thus, the rear focal plane signal lever 242 is rotated anticlockwise, the mirror return signal lever 244 is rotated clockwise and the part 236b of the mirror kick up stopping claw 236 is rotated anticlockwise by means of the pin 244a. Now the part 235a of the mirror kick up lever 235 is disengaged so as to terminate the flipped up state of the mirror receiving plate 238 in such a manner that the mirror is returned the lower position by means of a spring not shown in the drawing. The automatic diaphragm return signal lever 211 is rotated anticlockwise by means of the lower end of the mirror return signal lever 244 so as to rotate the pin 209a of the common lever 209 anticlockwise. As a result the protuberance 205b of the automatic diaphragm lever 205 is disengaged. The automatic diaphragm lever 205 is rotated anticlockwise by means of the return spring 205. The pin 203 of the diaphragm driving ring at the lens side follows the rotation of the automatic diaphragm lever 205 by means of the spring not shown in the drawing so as to open the diaphragm blades completely and complete taking of a photograph.

The winding operation and the charging operation after having taken a photograph, take place as follows. The winding shaft 214 in functional engagement with the winding lever not shown in the drawing and the charge cam 215 are rotated along the direction of the arrow C. This rotates the charge conveying lever 216 clockwise so that the intermediate lever 218 connected with the lever 216 is also rotated clockwise. Due to the rotation of the intermediate lever 218 the charge lever 213 is rotated clockwise through the pin 218a. Hence the step part 213a of the pin charges the automatic diaphragm energy storing lever 206 anticlockwise against the force of the spring 206a until the lever 206 is stopped by the stopping claw 210. At the same time, the step part 213b of the pin rotates the part 219a of the three forked lever 219 clockwise so as to push the side face of the lower end part 229d of the stop wheel claw 229. The armature 220 of the stop wheel claw 229 is now attracted by the magnet $M_1$ against the force of the spring 229a. In functional engagement with the attraction of the armature 220, the rising part 219b of the three forked lever 219 is stopped by the hook part 221b of the release lever 221. Further the end part 206b of the automatic diaphragm energy storing lever 206 rotates the end part 234b of the mirror driving lever 234 clockwise against the force of the spring 234a. The mirror driving lever 244 is stopped by the stopping lever 210 of the above mentioned automatic diaphragm energy storing lever 206 so that the mirror driving lever 234 is stopped in a charged state. In accordance with the mirror driving 234, the kicking up stopping claw 236 is rotated along the same direction so as to stop the mirror kick up lever 235. The front forcal plane release lever 240 is, in functional engagement with the winding mechanism not shown in the drawing, rotated by means of the set lever 240b against the force of the spring 240a until the release lever 240 is stopped by means of the front focal plane stopping level 239. Similarly to the charging of the automatic diaphragm unit and the mirror lifting unit, the end part 213d of the charge lever 213 rotates the lower end 222a of the charge gear 222 of the automatic exposure control unit. This charges the sector gear 223 in such a manner that the stopping plate 223d is stopped by the Ae stopping lever 228. Rotation of the sector gear 223 moves the signal lever 231 upwards (clockwise). This charges the arm 202c of the diaphragm preset ring 202 at the lens anticlockwise against the force of the spring 202a at the preset start position (the totally opened position) of the diaphragm preset ring 202.

The rotation of the intermediate lever 218 carries out the charging in such a manner that the armature 347 with the permanent magnet $M_2$ of the camera release unit is attracted by $M_2$. By means of the magnet charge plate 218b of the intermediate lever 218 the pin 249b of the start signal lever 249 is rotated clockwise so as to charge the armature holding lever 246 along the same direction against the spring 246a, whereby the armature holding lever 246 is attracted by the magnet $M_2$ with the permanent magnet. At this time, the armature 247 is charged in accordance with the amount of rotation of the intermediate lever 218. The magnet charge plate 218b is composed of an elastic body in order to absorb the fluctuation of the rotation amount in such a manner that the armature 247 is attracted by the above mentioned magnet $M_2$ with the permanent magnet while the charge amount is kept sufficiently in order to absorb the fluctuation.

When the photographic lens has been set at the manual diaphragm index from the AE index, namely set for the manual photography, it is sufficient to assure that the rotation of the stop wheel 227 of the automatic exposure control unit can not be stopped by means of the "automatic—manual" switching over signal pin 204 of the photographic lens through a switch not shown in the drawing or a signal mechanically linked with the switch. Hence, for example, the current supply to the magnet $M_1$ for controlling the automatic exposure is kept till the start of the front focal plane or the stop wheel claw is stopped mechanically. Other operations are same as those already mentioned above.

As explained above, it is so composed that the electromagnet and its armature composing the electromagnetic release device is arranged in a flat narrow space usually left at the bottom of the ordinary single lens reflex camera. Thus, by adding a few members the ordinary single lens reflex camera can easily be converted into the one operated by means of the electromagnetic release. Further, in the neighborhood of the electromagnetic release device provided at the bottom part of the camera body there are arranged the automatic diaphragm mechanism or the mirror quick return mechanism. Therefore it is possible for the electromagnetic release device to carry out the release operation of a predetermined mechanism without providing any connecting member. This presents mechanical loss due to the connecting mechanism so that a sure operation can be carried out by means of a magnet with small power. Also, because the electromagnetic release device unit is contained in a casing, dust mainly consisting of the metal powder produced by the mechanical friction in the camera is prevented from being deposited directly between the pole pieces and the armature. By cementing a magnetic plate on the casing itself or by forming the casing itself from a magnetic plate any misoperation due to the external magnetic flux or the disturbing magnetic flux due to the built-in electromagnet can be completely excluded. This is quite advantageous and improves the reliability of the operation. On the other hand, the unit itself is fixed on the frame of the casing. The armature itself is provided in such a manner that it is possible to connect the electromagnetic control unit with the camera simply by mounting the unit on the camera, which makes the assembly work very simple.

Figure 8:
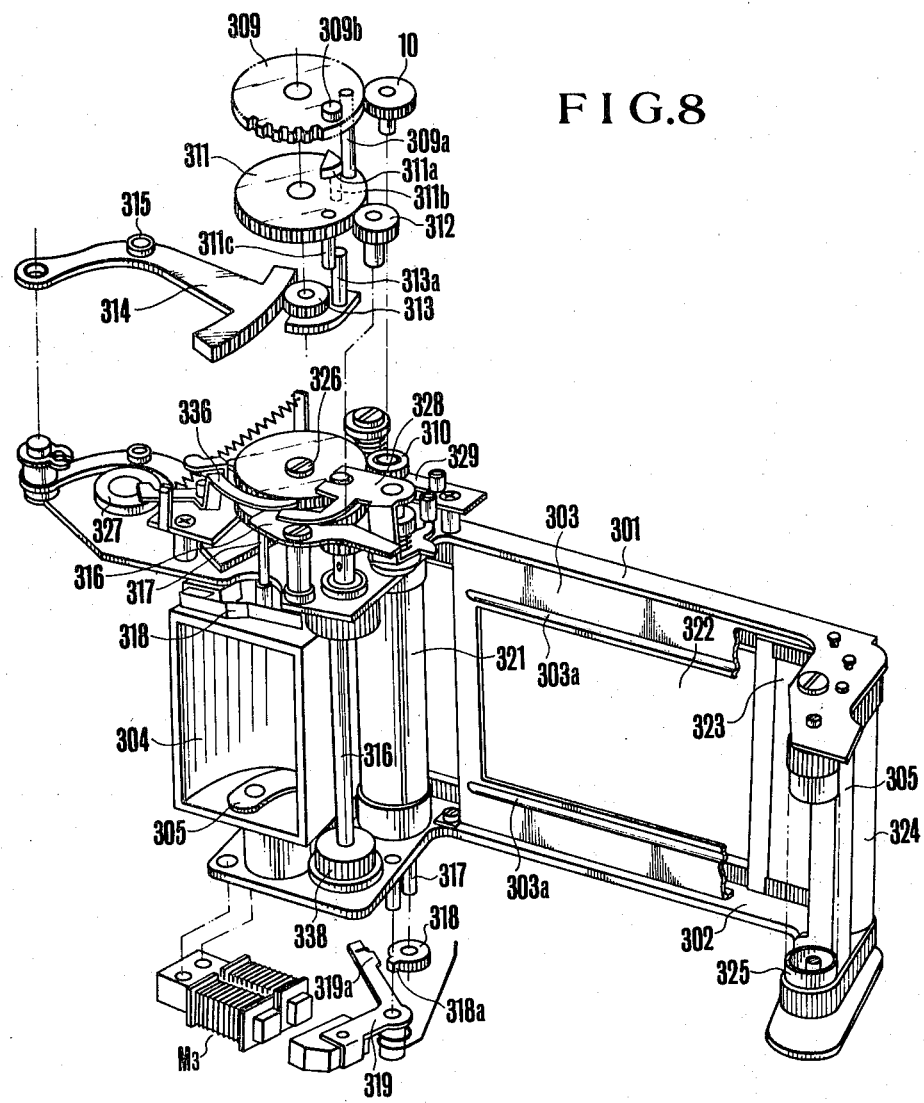
FIG. 8 shows the composition of the electronic shutter unit shown in FIGS. 2 and 3.

FIG. 8 shows the electronic shutter unit shown in FIGS. 2 and 3. Here the upper and lower base plate 301 and 302 are supported by the stays 304 and 305 formed of aluminium diecasting or plastics.

Further, the stay 304 also serves as the battery box in such a manner that the battery can be loaded between the upper and the lower base plate.

The shading plate 303 is provided at the photographic opening so as to control the light beam coming from the lens optics as well as to maintain the rigidity of the shutter unit casing formed of the above mentioned base plates, the stays and so on. Mounted on the upper and the lower base plate is the shutter mechanism. In a single lens reflex camera the base plates are correspondingly cut open, as shown in the drawing, so as to contain the mirror box. When the camera frame body 12 and the mirror box 18 are connected with each other as is shown in FIG. 3, they form the camera body.

Below, the shutter mechanism will be explained in accordance with FIG. 8. A master shaft 326 provided on the upper and the lower base plate supports the rotatable front focal plane master gear 311 and the rotatable rear focal plane master gear 309. Two pinion shafts 316 and 317 support the front focal pinion 312 and the rear focal pinion 310 engaging the master gears 311, 309. The shafts 316 and 317 are rotatably mounted on the upper and the rear base plates. The front focal plane spring drum 325 and the rear focal plane spring drum 324 are also rotatably mounted between the upper and the lower base plate. The front focal plane, or front focal plane curtain 323 and the rear focal plane, or rear focal plane curtain, 322 extend between the pinion shafts and the spring drums.

The camera frame body supports a conventional winding mechanism such as the winding up shaft, the sprocket and so on. A cam not shown in the drawing, and carried by the bearing 327 conveyer power to the roller 315 from the winding shaft. The roller 315 is provided on the sector gear 314 carried by the upper base plate. The sector gear 34 meshes with the shutter winding gear 313 on the master shaft and rotates the latter. On the winding up gear 313, a pin 313a is provided in such a manner that the front focal plane master gear and the rear focal plane master gear are rotated by means of the pins 311-c, 311-a on the front focal plane master gear and the pin 309-a on the rear focal plane master gear. In consequence, the front pinion shaft and the rear pinion shaft are rotated so that the focal planes 322 and 323 are wound up at the side of the pinion shaft, so as to charge the springs in the spring drums 324 and 325.

When the front plane master gear is rotated up to the position at which the master gear is stopped by the holding hook 316, the rear focal plane holder 318 connected with the rear focal plane pinion shaft 317 is also stopped by the holding hook 319.

When later the lift of the above mentioned cam is lowered a spring returns the sector gear 314 to the position it assumed before winding up. The wind up gear 313 also returns to the position it assumed before winding.

When a release signal comes from the mirror-automatic diaphragm mechanism not shown in the drawing, and is due to the shutter release operation, the front plane holding hook 316 is disengaged. The front plane master gear 311, the pinion 312 and the shaft 316 rotate so as to allow the front plane to start to run. At the same time, the count start switch 318 of a conventional electronic shutter circuit is opened. After the elapse of a given time decided by the time constant circuit, the electromagnet $M_3$ mounted on the lower base plate operates. This disengages the rear focal plane holding hooks 318, 319 and allows the rear focal plane master gear 309 to rotate so that the exposure is completed.

Figure 9:
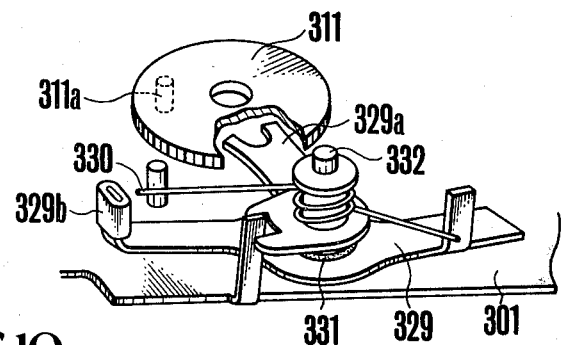
FIG. 9 shows the composition of the brake for the front focal plane shown in FIG. 8.

FIG. 9 shows an embodiment of the front focal plane brake. Here, one end 329-a of the front plane brake lever 329 engages with the pin 311-a on the front focal plane master gear before the front focal plane has run. This rotates the front focal plane 329 around the shaft 332. Further, the spring 320 is, in case the front focal plane rotates along the direction along which the front focal plane runs, hanged along the direction along which the spring 320 is charged by means of the pin 311-a in such a manner that the front focal plane brake lever 329 is pressed along the direction of the axis 332 by means of a friction member 331 consisting of for example leather. In consequence as the braking force against the front focal plane the charge force of the above mentioned spring and the friction force serve. The end part 329a of the brake lever is Y-shaped so that at the moment that the pin 311-a and the end part 329-a engages with each other the brake lever springs back along the reversed direction to the running front focal plane and therefore the improper exposure is avoided. Due to the rotation of the front focal plane brake lever 329, the synchronization contact is operated by means of its end part 329b. When the shutter is charged the front focal plane master gear 311 rotates. This pushes the one branch of the Y-shaped part 329-a of the brake lever 329 by means of its pin 311-a. At the same time the operation ready state of the front focal plane brake is restored, being supported by the effect of the spring 330.

Figure 10:
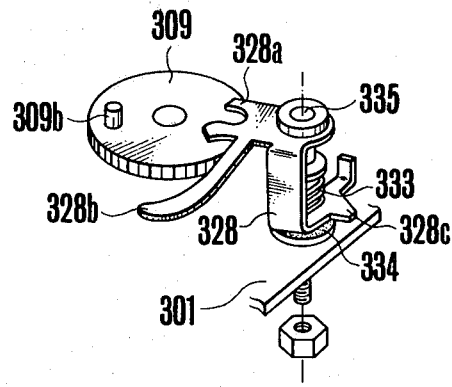
FIG. 10 shows the composition of the brake for the rear focal plane shown in FIG. 8.

FIG. 10 shows the rear focal plane brake. Here, member 328 is the rear focal plane brake lever, 333 the spring, and 334 the friction member such as leather. The operation is same as that of the front focal plane brake, namely the pins a—b on the rear focal plane master gear engages with the one end 328-a of the rear focal plane brake lever 328.

When the rear focal plane has run, the winding stop release signal is conveyed to the winding up stop lever 36 from the one end 328-b of the rear focal plane brake lever. From the other end 328-c the rear focal plane running completion signal is conveyed to the mirror mechanism not shown in the drawing.

Figure 11:
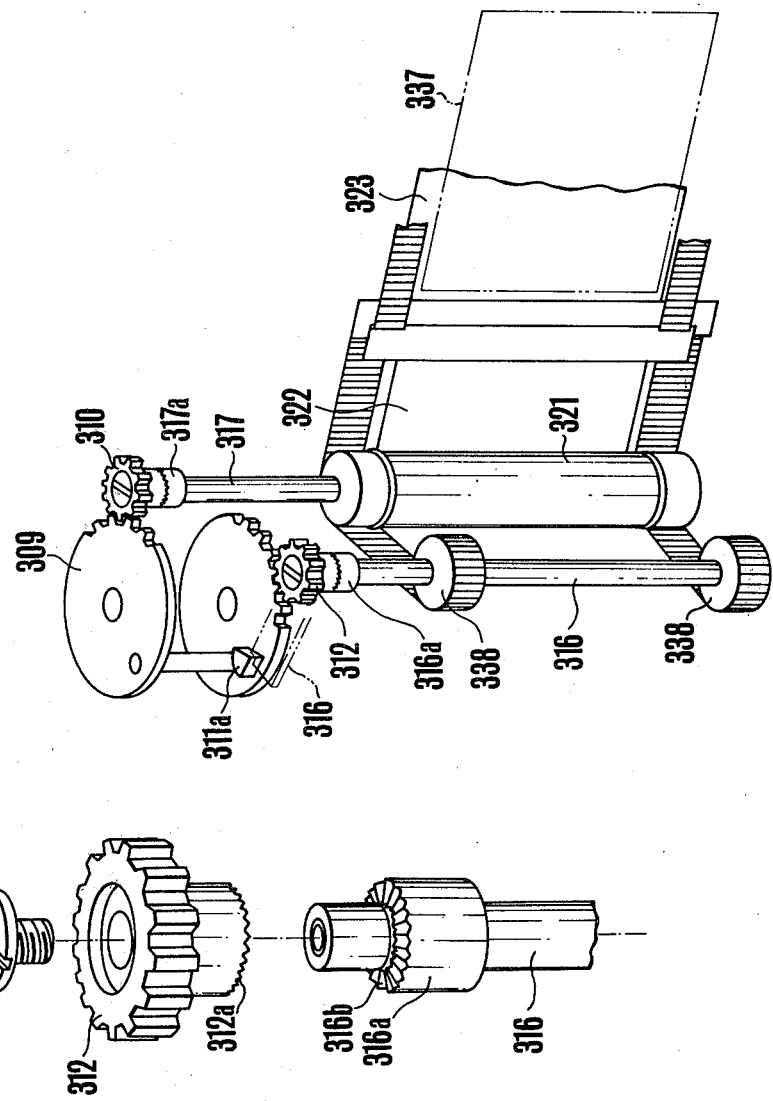
FIG. 11 shows the composition of the important part at which the pinion gear shown in FIG. 8 engages with the pinion shaft.
Figure 12:
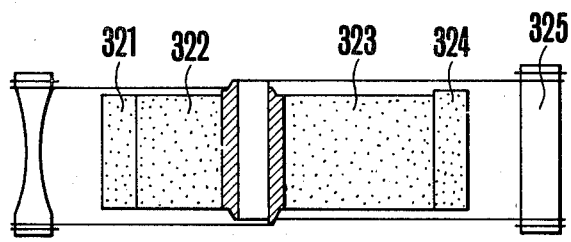
FIG. 12 shows the spring drum shown in FIG. 8, being made as one body with the planes and the rollers.

FIGS. 11 and 12 show the relation of the composition between the front and the rear master gear and the rear focal plane.

The end at the side of the pinion gear 312, of the front focal plane pinion shaft 316 is provided with the teeth having a corresponding pitch in connection of the tooth number of the pinion gear 312 as is shown in 316-b. The other end 312-a of the pinion gear 312 is provided with similar teeth.

In consequence, the toothed face 312-a of the pinion gear 312 and that 316-b of the shaft are engaged with each other into one body by means of a screw 338. The assembly phase can be choosen freely in accordance with the above mentioned tooth number.

The spring drum 324, the focal plane 322 and the roller 338 for the front focal plane one side and the spring drum 325, the focal plane 323 and the roller 321 on the other side may be found in a single assembled unit as is shown in FIG. 12 before the assembly of the shutter. It is then possible to mount the front focal plane roller 338 on the shaft 316 and the rear focal plane roller 321 on the shaft 317 even if the engagement phase between the respective master gear and the pinion gear is fixed. Moreover. the starting position of the front focal plane and that of the rear focal plane relative to the photographic opening 337 can be adjust. The amount of overlap of the front focal plane 323 over the rear focal plane 322 can also be adjusted.

As is clear from the above explanation, the shutter unit in accordance with the present invention includes not only the mechanical as well as the electric parts essential for the operation of the shutter but also the fine adjustment mechanism of the shutter plane position on the pinion shaft. Thus it is possible to check and adjust the efficiency of the electronic shutter as one shutter body.

As is shown in the above mentioned FIG. 8, the front focal plane and the rear focal plane forming the shutter are mounted on the upper and the lower base plate respectively. Their L-shaped shutter running course is formed with the spring drums 324, 325. The left ends of those base plates the components such as the battery chamber 304, the master drums, the electromagnet and so on, essential for the driving and the controlling of the shutter, are provided in form of U shaped body.

Figure 14:
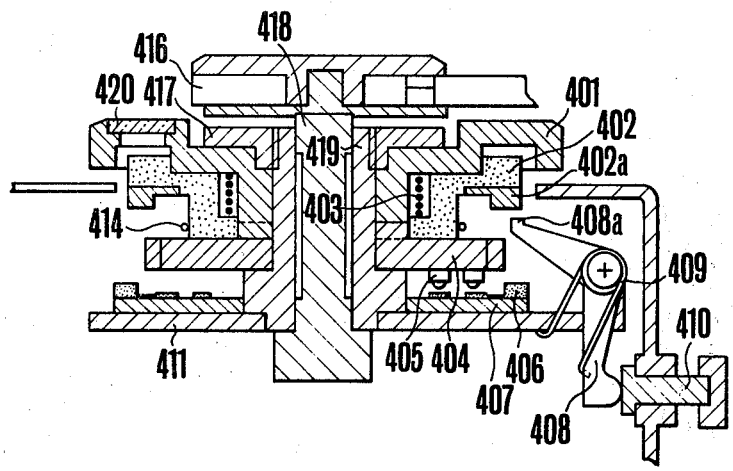
FIG. 14 shows the shutter dial shown in FIG. 13 in section.
Figure 13:
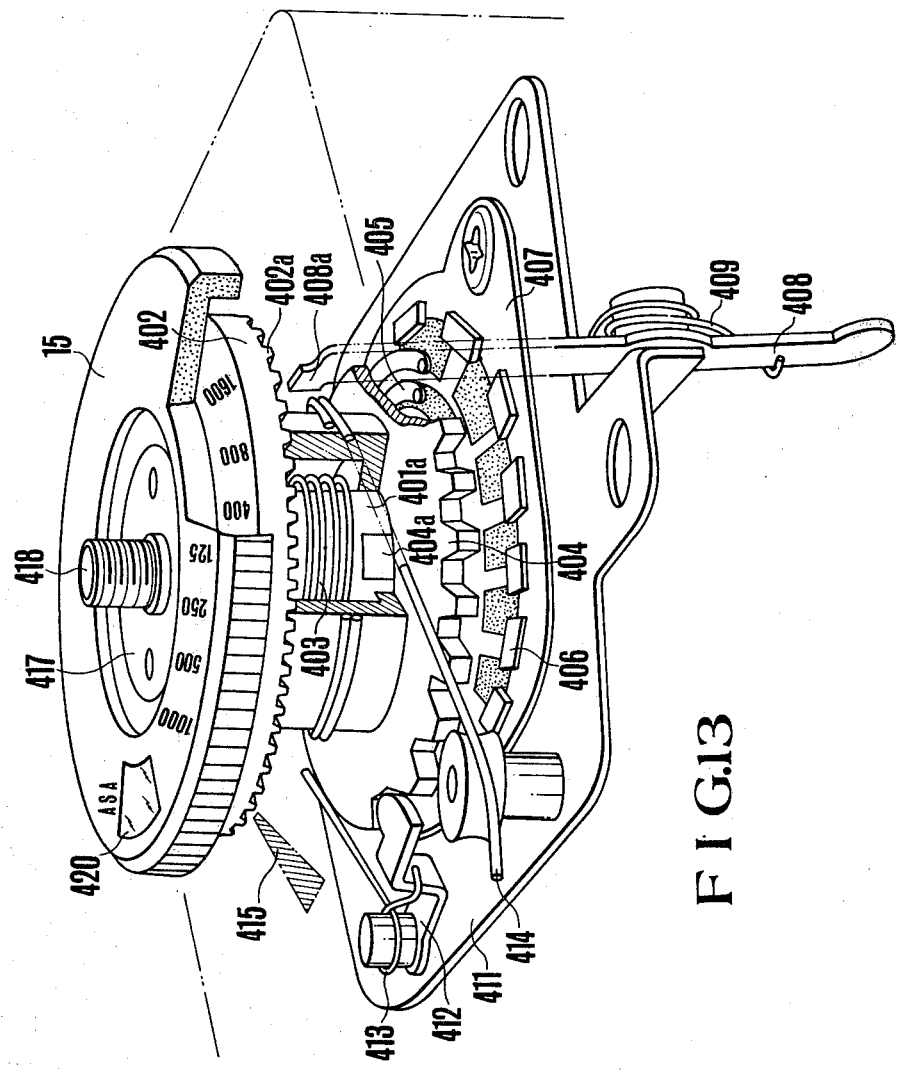
FIG. 13 shows the composition of the shutter dial mounted as one body with the shutter unit shown in FIG. 8.

In consequence, as is shown in FIG. 3 such shutter unit can easily be built in the open cut part of the ordinary camera. Further, the battery chamber 304 can be provided in the space in the shutter unit. It is possible to adjust the shutter unit before being built in the camera body. In case of the above mentioned shutter unit, it is presumed that the adjusting unit for adjusting the shutter time is formed on the camera body as an independent member. It is possible to offer an independent shutter unit capable of carrying out a complete operation. This is done forming the shutter dial and the variable resistance in functional engagement with the shutter dial as one unit as is shown in FIGS. 13 and 14. The unit is provided over the battery chamber.

Below the composition of the shutter dial adjusting mechanism to be mounted additionally will be explained in detail in accordance with an embodiment shown in FIGS. 13 and 14.

In FIGS. 13 and 14, a wind up shaft 418 transmits the winding force of the winding up lever 416 to the winding up mechanism not shown in the drawing. A bearing 419 of the above mentioned winding up shaft 418 is joined with the base plate 411 of the shutter dial mechanism. A shutter 15 on whose circumference the shutter times are indicated at a suitable angle distance, is in rotatable engagement with the above mentioned bearing. An ASA (Film sensitivity) dial 402 shows the ASA sensitivities in accordance with the above mentioned shutter time indication distance in such a manner that the set ASA sensitivity is indicated through the opening provided on the shutter dial 401. A spring 403 between the ASA dial 402 and the shutter dial 401 exerts pressure along the axial direction and a frictional force takes place between the ASA dial 402 and the member to be explained later. A member 404 having a contact 405 for the shutter time control resistance, is in rotatable engagement around the winding lever 419 similar to the above mentioned shutter dial 401. Further on the circumference of the member 404 notches are provided at the same distance as that for the above mentioned shutter time indication so as to control the position of the above mentioned contact 405 and the indication position of the shutter time by means of the lever 412 and the spring 413. A convex part 404-a of number 404 engages the concave part 401-a of the shutter dial, which is rotatable with 401. Member 406 is the shutter time control resistance. When the shutter time indicated on the shutter dial coincides with the index 415 provided on the body or the like, the resistance value corresponding to the shutter time is connected with the electronic shutter time constant circuit not shown in the drawing through the contact.

The ASA dial is rotated in unison with the shutter dial 401 and the member 404 by means of the frictional force of the above mentioned spring. Thus the ASA value indicated through the indication opening of the 401 does not vary even when the shutter time is varied.

On the other hand, on the circumference of the ASA dial 402 the concave and convex parts 402-a are provided at a certain distance corresponding to the distance between the above mentioned ASA indication. When the member 410 is pushed in the lever 408 is rotated against the force of the spring 409 in such a manner that its one end 408-a engages the above mentioned part 402-a. In this state, when the shutter dial 401 is rotated, only 401 and 404 are rotated because the ASA dial is stopped by the lever 408. In consequence, the set ASA value indicated through the ASA indication opening provided on 401 can be varied. At the same time, the relative position of the shutter dial 401 as well as of the ASA dial 402 to the index 415 is varied in such a manner that the so called sum of the film sensitivity and of the shutter time can be obtained. This sum is indicated as the phase angle of the index 415 to the ASA dial 402. Thus when a member such as a fiber 414 is provided on the circumference of 402, the shutter time information as well as the film sensitivity information can be entered in the exposure control circuit or the exposure control mechanism.

Figure 15:
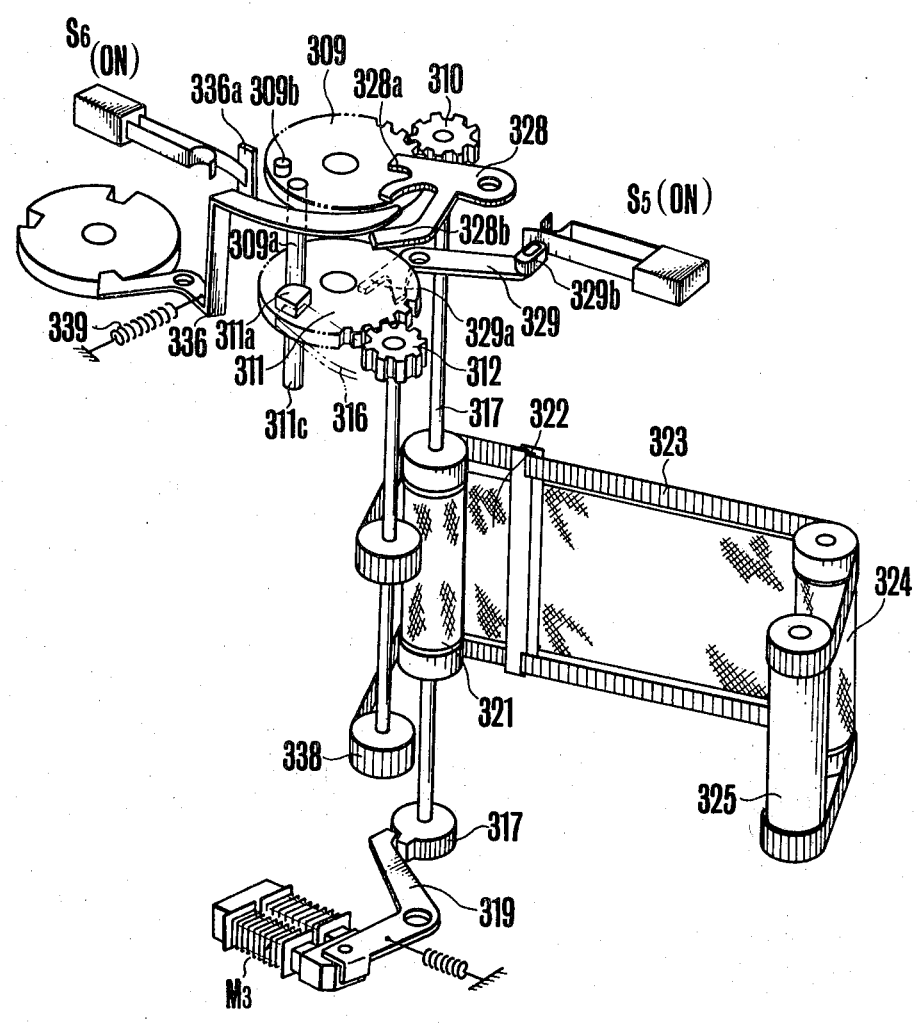
FIGS. 15, 16 and 17 respectively shows the switch mounted as one body with the shutter unit shown in FIG. 8.
Figure 16:
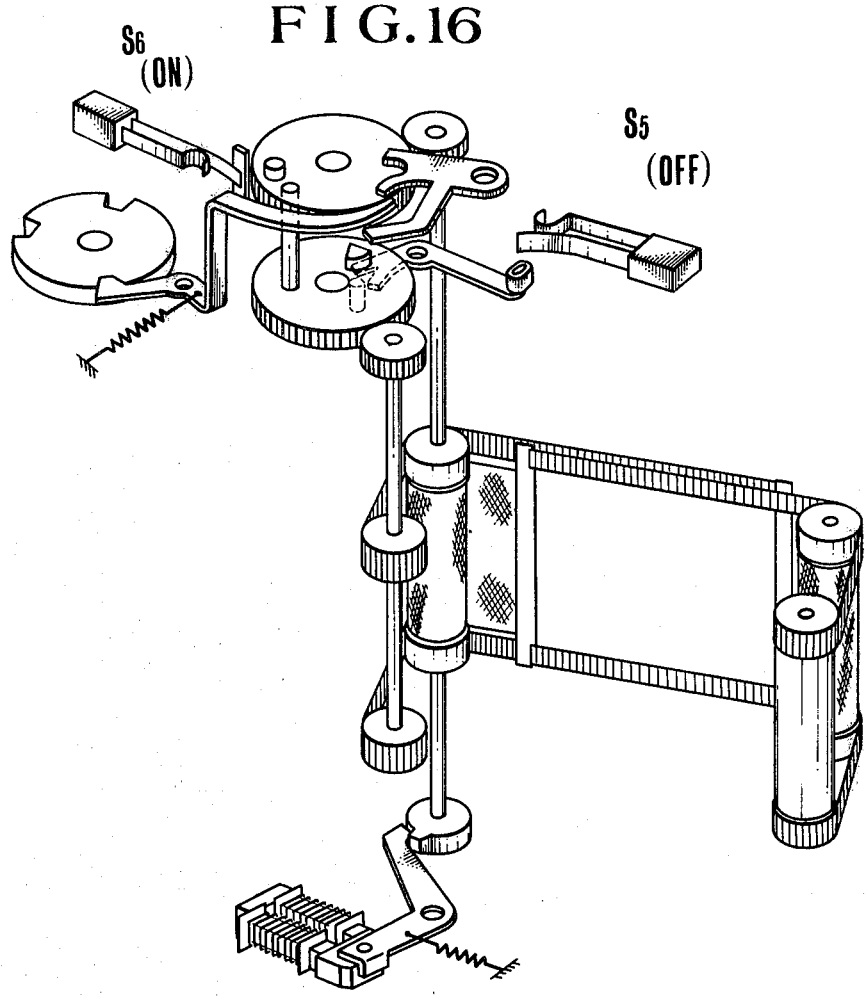
Figure 17:
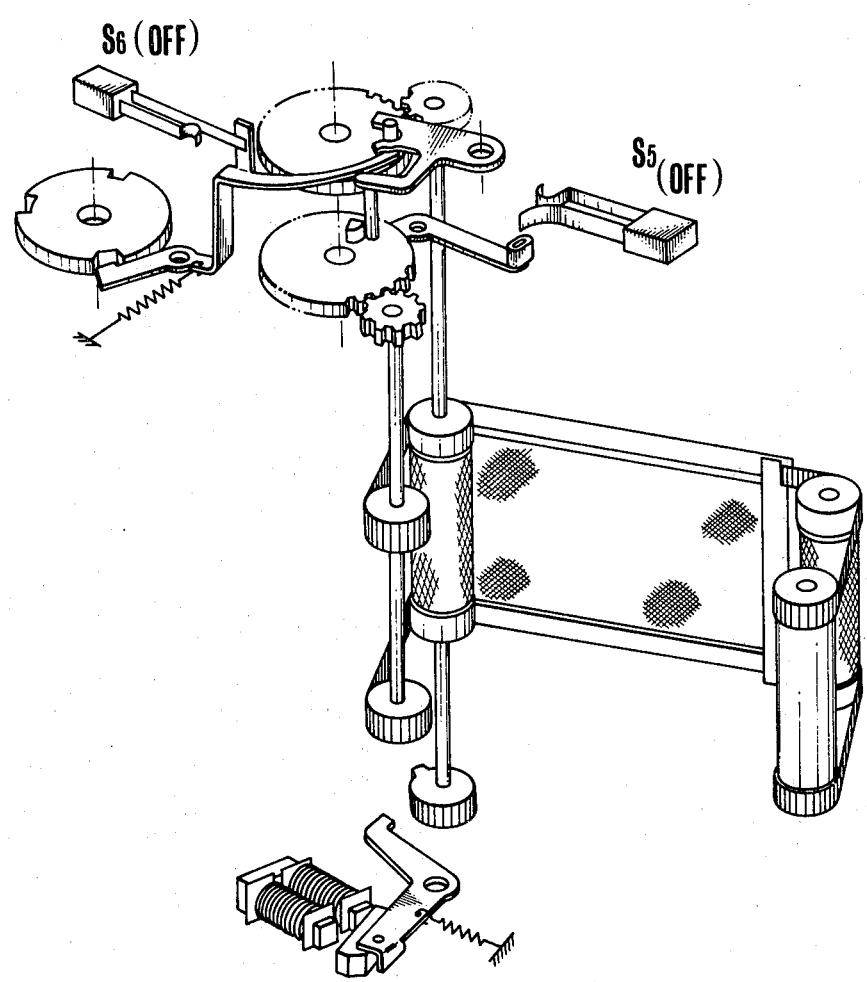

The power economizing switch $S_5$ in functional engagement with the front focal plane brake and the winding safety switch $S_6$ in functional engagement with the rear focal plane brake in the shutter unit appear in detail in FIGS. 15, 16 and 17.

FIG. 15 shows the principal components of the shutter mechanism in the charged state of the shutter. In this state, the switch to be opened and closed by the rotation of the front focal brake 329 remains in the closed state. The switch $S_6$ to be opened and closed by the rotation of the winding up stop lever 336 also remains in the closed state. When at this time, the front curtain is disengaged from member 311-a of the front focal plane holding member 311, the front focal plane starts to run. In consequence, the front focal plane master gear 311 is rotated anticlockwise. Immediately before the front focal plane has run the pin 311-c on the front focal plane master gear engages the one end of the front focal plane brake lever 329-a so as to rotate 329 clockwise. Thus the switch S₅ is closed by means of the one end 329-b of the front focal plane brake 329 is opened. FIG. 16 shows the above mentioned state.

When then after the elapse of the time determined by the time constant circuit the magnet 320 holding the rear focal plane curtain operates so as to disengage 17 from 19, the rear focal plane starts to run. Thus the rear focal plane master gear also rotates anticlockwise, while immediately before the rear focal plane curtain has run the pin 309-b on 309 engages with the one end 328-a of the rear focal plane brake lever 328 so as to rotate 328 clockwise. In this case, the other end 328-b of 328 rotates the winding up stop lever 336 anticlockwise. In consequence the switch S₆ is closed by means of the projecting part 336-a of 336 is opened. Namely, when the rear focal plane has run both switches S₅ and S₆ assume the opened state. FIG. 17 shows the above mentioned state. When the winding up operation is carried out the master gears 309 and 311 are rotated clockwise. Thus the brake levers 328 and 329 respectively engaged with the pins 309-b and 311-c are rotated anticlockwise.

Due to the anticlockwise rotation of the front focal plane brake 329 the switch S₅ is closed by means of the one end 329-b of the brake 329. Due to the anticlockwise rotation of the rear focal plane brake 328 the winding step lever 336 is rotated clockwise by means of the spring 39 in such a manner that the switch S₆ is closed by means of the projecting part 336-a. Hence, the state shown in FIG. 15 is resumed.

In accordance with the present invention, the focal plane shutter unit is U-shaped and built in the space between the film feeding chamber and the film winding up chamber in the camera. Thus the shutter unit can be built in an ordinary compact camera while the above mentioned spaces on both sides can be used almost equally for the winding drums to be provided on both U-shaped sides as well as for the electrical parts such as the battery chamber and the driving mechanism. Therefore the exposure frame of the shutter can be placed almost in the middle.

In consequence it is possible to build the shutter unit in the camera in such a manner that the size of the camera need not to be enlarged along the vertical direction (along the direction vertical to the plane in which the focal plane shutter runs) as well as the horizontal direction. Thus the shutter unit is remarkably advantageous especially to compact 35 mm cameras. Further in accordance with the present invention, the front shutter focal plane and the rear focal plane distance adjusting mechanism are provided in the shutter focal plane driving mechanism. After the shutter focal planes are mounted in the unit the determined distance can optionally be adjusted so that the distance can be adjusted before the unit is built in the camera. This is quite advantageous. Otherwise the adjusting operation would be carried out in a small space after the unit is built in the camera. The electrical components such as the battery, the electromagnets and so on are formed so as to be capable of being built in the unit. It is not necessary to provide chambers for containing the electrical components for controlling the shutter electronically in the camera body. Therefore the electrical components are not provided at the side of the camera casing but in the shutter unit. The electrical wiring as well as the mechanical linkage can be kept to the minimum with the result that the assembly work is remarkably easy. This is quite effective for the shutter of cameras, especially for compact cameras.

In the above mentioned embodiments the variable resistance to be set by means of the shutter dial is provided as an independent body of the shutter unit. However, it is not always necessary to provide the resistance as an independent body. It is also possible to reduce the mechanical linkage by providing it in the battery chamber of the unit.

What is claimed is:

1. A single lens reflex camera comprising:
 a shutter device,
 shutter driving means for driving the shutter device,
 a mirror device,
 mirror driving means for driving the mirror device,
 a diaphragm device,
 diaphragm driving means for driving the diaphragm device,
 starting means for starting the shutter driving means, the mirror driving means and the diaphragm driving means,
 a magnetic release device for actuating the starting means and including an electromagnet, coupling means magnetically responsive to the electromagnet and coupled to the starting means for actuating the starting means in response to the energization of the electromagnet and release thereof, and
 a dust proof case for casing the electromagnet and the coupling means, a portion of the coupling means projecting from the case for coupling to said starting means.

2. A single lens reflex camera as in claim 1, wherein said dust proof case includes a portion of non-magnetic material for shielding the electromagnet.

* * * * *